US008957921B2

(12) United States Patent
Bae

(10) Patent No.: US 8,957,921 B2
(45) Date of Patent: Feb. 17, 2015

(54) MOBILE TERMINAL AND MAP SEARCHING METHOD THEREOF

(75) Inventor: Dae-Jin Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 982 days.

(21) Appl. No.: 12/755,310

(22) Filed: Apr. 6, 2010

(65) Prior Publication Data

US 2011/0115822 A1 May 19, 2011

(30) Foreign Application Priority Data

Nov. 19, 2009 (KR) .......................... 10-2009-0112216

(51) Int. Cl.
*G09G 5/00* (2006.01)
*G09B 29/10* (2006.01)
*G06F 3/0488* (2013.01)
*G06F 3/041* (2006.01)
*G01C 21/36* (2006.01)

(52) U.S. Cl.
CPC .......... *G09B 29/106* (2013.01); *G06F 3/04883* (2013.01); *G06F 2203/04806* (2013.01); *G01C 21/367* (2013.01)
USPC .......................................... 345/661; 345/173

(58) Field of Classification Search
CPC .............. G09B 29/109; G06F 3/04883; G06F 2203/04806; G01C 21/367
See application file for complete search history.

(56) References Cited

U.S. PATENT DOCUMENTS

| 5,867,150 | A | * | 2/1999 | Bricklin et al. | 345/173 |
| 6,211,856 | B1 | * | 4/2001 | Choi et al. | 345/666 |
| 2003/0112228 | A1 | * | 6/2003 | Gillespie et al. | 345/173 |
| 2003/0122787 | A1 | * | 7/2003 | Zimmerman et al. | 345/173 |
| 2004/0162669 | A1 | * | 8/2004 | Nagamasa | 701/208 |
| 2006/0001650 | A1 | * | 1/2006 | Robbins et al. | 345/173 |
| 2006/0112350 | A1 | * | 5/2006 | Kato | 715/781 |
| 2007/0103294 | A1 | * | 5/2007 | Bonecutter et al. | 340/539.18 |
| 2007/0109323 | A1 | * | 5/2007 | Nakashima | 345/661 |
| 2007/0247435 | A1 | * | 10/2007 | Benko et al. | 345/173 |
| 2012/0169776 | A1 | * | 7/2012 | Rissa et al. | 345/676 |

FOREIGN PATENT DOCUMENTS

JP 05216398 A * 8/1993 ............. G09B 29/10

* cited by examiner

*Primary Examiner* — Kimbinh T Nguyen
*Assistant Examiner* — Raffi Isanians
(74) *Attorney, Agent, or Firm* — Lee, Hong, Degerman, Kang & Waimey

(57) ABSTRACT

Disclosed are a mobile terminal and a map searching method thereof, the mobile terminal including a communication unit configured to receive map data, a display unit configured to display the map data, the display unit configured as a touch screen, and a controller configured such that when a touch input is detected on the touch screen, if the detected touch input is a zoom-out move command, the controller determines a zoom-out scale, a movement speed and a movement direction based upon the touch input, and zooming out the map data to fit into the determined zoom-out scale and moving the map data in the determined direction and at the determined speed.

19 Claims, 11 Drawing Sheets

(a)

(b)

(d)

(c)

(a)

(b)

(c)

(a)

(b)

(c)

(a)

(b)

(c)

(a)

(b)

(c)

MOBILE TERMINAL AND MAP SEARCHING METHOD THEREOF

CROSS-REFERENCE TO RELATED APPLICATION

Pursuant to 35 U.S.C. §119(a), this application claims the benefit of earlier filing date and right of priority to Korean Application No. 10-2009-0112216, filed on Nov. 19, 2009, the contents of which is incorporated by reference herein in its entirety.

BACKGROUND OF THE INVENTION

1. Field of the Invention

The present invention relates to a mobile terminal and a method of searching fast for a desired position on a map.

2. Background of the Invention

As terminals, such as computers, laptop computers, mobile phones and the like, become multifunctional, the terminals can be allowed to capture still images or moving images, play music or video files, play games, receive broadcast and the like, so as to be implemented as an integrated multimedia player.

In general, terminals may be divided into a mobile terminal and a stationary terminal according to their mobilities. The mobile terminal may then be categorized into a handheld terminal and a vehicle mounted terminal according to whether a user can carry it around.

Structure and/or software improvement of the terminals may be considered in order to support and enhance the functions of the terminals.

A terminal having a touch screen is configured such that when a touch input is detected on the touch screen, an operation of the terminal is controlled according to the detected touch input. Upon checking data, such as map, image, list and the like, displayed on the touch screen, a user performs flicking on the touch screen to move the data to his or her desired position. Here, if the flicking is continuously repeated, the terminal moves data as many as the number of flicking at fast speed. Consequently, a problem occurs that user's desired data are frequently missed the user frequently misses checking desired data displayed on the touch screen.

SUMMARY OF THE INVENTION

Therefore, an object of the present invention is to provide a mobile terminal capable of moving map data with adjusting a scale of the map data to fit into a preset scale at a preset ratio every time a flicking event is generated after generation of a consecutive flicking event, and a map searching method thereof.

Another object of the present invention is to provide a mobile terminal capable of moving map data with adjusting a scale of the map data when a move command is input after generation of a specific event, and a map searching method thereof.

To achieve these and other advantages and in accordance with the purpose of the present invention, as embodied and broadly described herein, there is provided a mobile terminal including a communication unit configured to receive map data, a display unit configured to display the map data, the display unit configured as a touch screen, and a controller configured such that when a touch input is detected on the touch screen, if the detected touch input is a zoom-out move command, the controller determines a zoom-out scale, a movement speed and a movement direction based upon the touch input, and zooming out the map data to fit into the determined zoom-out scale and moving the map data in the determined direction and at the determined speed.

In accordance with one embodiment of the present invention, there is provided a map searching method for a mobile terminal, the method including executing a map function and displaying map data, detecting a preset number of flicking operations on a display screen within a preset time, the display screen adapted to display the map data, zooming out the map data to fit into a preset scale if the preset number of flicking operation is detected, and displaying the zoomed-out map data with moving the same.

In accordance with another embodiment of the present invention, there is provided a map searching method for a mobile terminal, the method including executing a map function and displaying map data on a display screen, detecting a touch input on the display screen, and moving the map data with zooming out into a preset scale in response to the touch input if the touch input is a zoom-out move command.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the preferred embodiments according to the present invention, with reference to the accompanying drawings. For the sake of brief description with reference to the drawings, the same or equivalent components will be provided with the same reference numbers, and description thereof will not be repeated.

Mobile terminals described in the present invention may include mobile phones, smart phones, laptop computers, digital broadcasting terminals, personal digital assistants (PDAs), portable multimedia players (PMPs), navigators, and the like. However, it can be easily understood by those skilled in the art that the configuration in accordance with the preferred embodiment of the present invention may be applicable to stationary terminals, such as digital TVs, desktop computers and the like, excluding a case of being applicable only to the mobile terminals.

Figure 1:
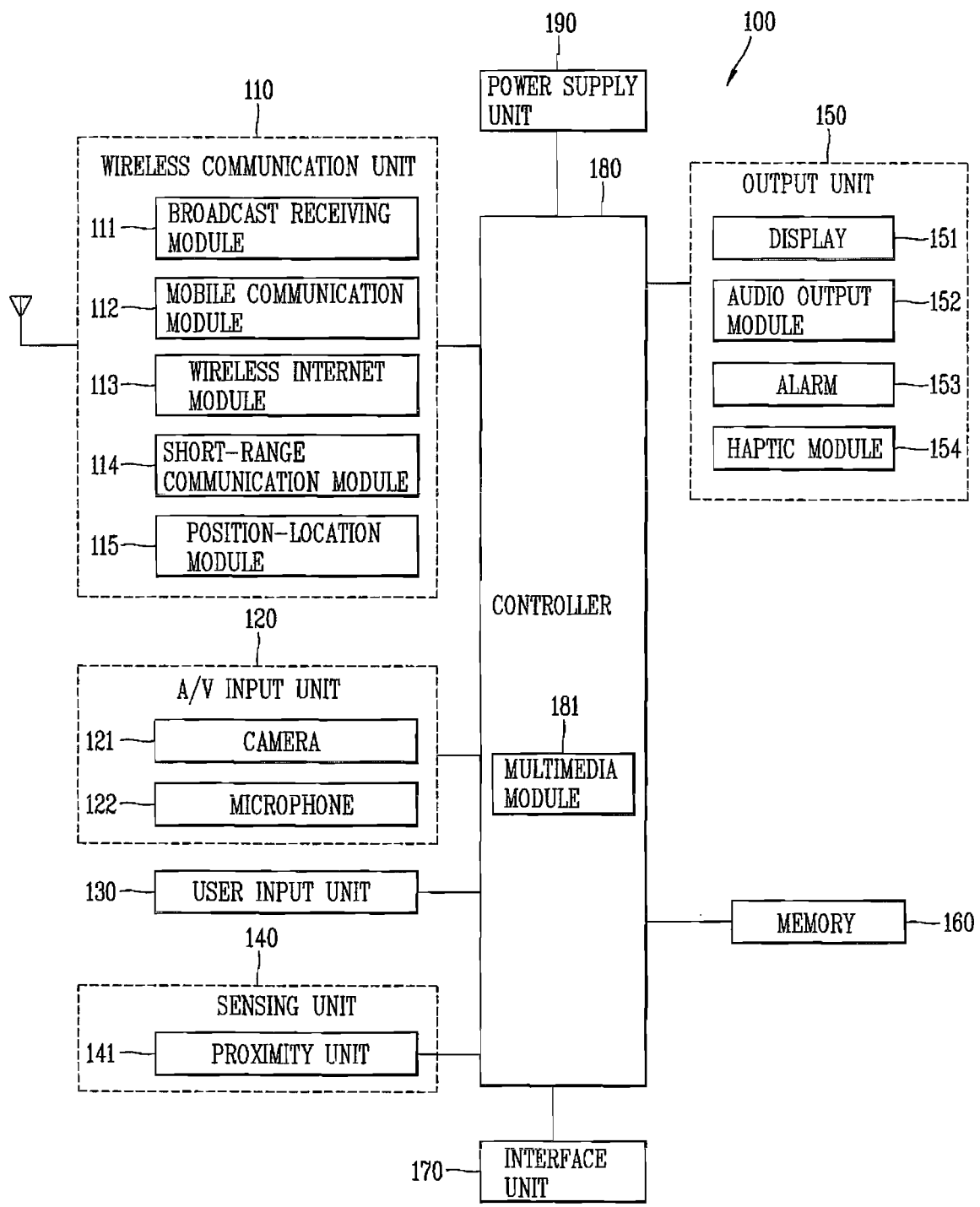
FIG. 1 is a block diagram of a mobile terminal in accordance with one embodiment of the present invention.

FIG. 1 is a block diagram of a mobile terminal in accordance with one embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the portable terminal. This module may be internally or externally coupled to the portable terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a portable terminal. An example of the position location module 115 may include a Global Position System (GPS) module.

Referring to FIG. 2, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the use environment of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device and the like. Moreover, the sensing unit 140 may include a proximity sensor 141.

The output unit 150 is configured to output an audio signal, a video signal or an alarm signal. The output unit 150 may include a display unit 151, an audio output module 152, an alarm 153, a haptic module 154 and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a 'touch sensor') have a layered structure therebetween, the structure may be referred to as 'touch screen'. In this structure, the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

As shown in FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various haptic effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like.

The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
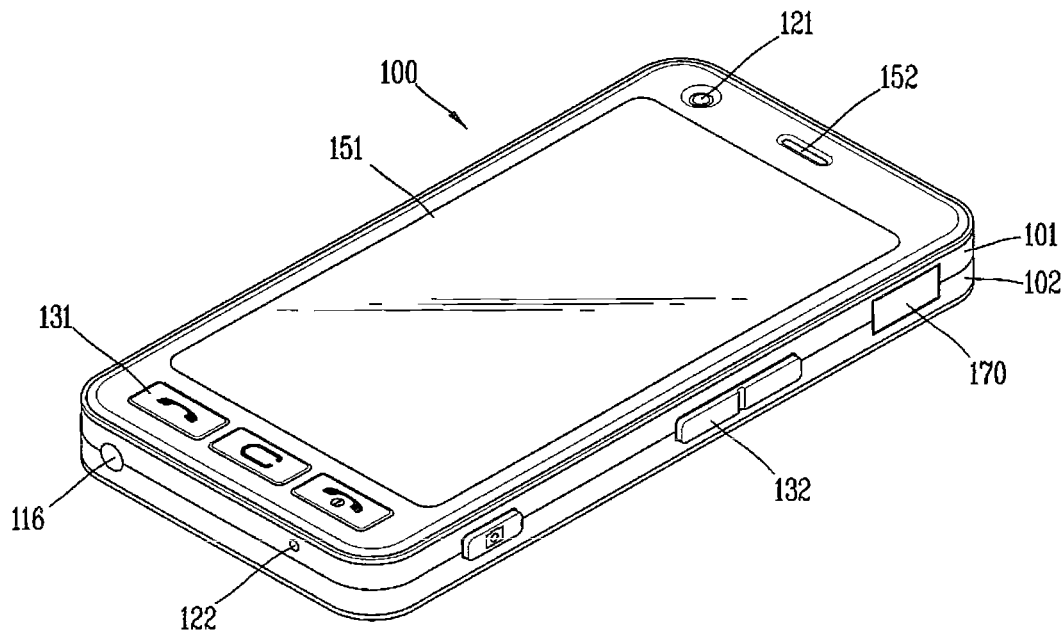
FIG. 2A is a front perspective view of the mobile terminal in accordance with the one embodiment of the present invention.

FIG. 2A is a front perspective views of the mobile terminal in accordance with the one embodiment of the present invention.

The mobile terminal 100 described is a bar type body. However, the present invention is not limited to the type, but applicable to various configurations having two or more bodies to each other to be relatively movable, such as a slide type, a folder type, a swing type, a swivel type and the like.

A case (casing, housing, cover, etc.) forming an outer appearance of a terminal body. In this embodiment, the case may include a front case 101 and a rear case 102. A space formed by the front case 101 and the rear case 102 may accommodate various components therein. At least one intermediate case may further be disposed between the front case 101 and the rear case 102.

Such cases may be formed of injection-molded synthetic resin, or may be formed using a metallic material such as stainless steel (STS) or titanium (Ti).

The terminal body, in detail, the front case 101 is shown having a display unit 151, an audio output module 152, a camera 121, a user input unit 130 (e.g., 131, 132), a microphone 122, an interface unit 170 and the like.

The display unit 151 may occupy most of a main surface of the front case 101. The audio output module 152 and the camera 121 are disposed at a region adjacent to one of both end portions of the display unit 151, and the user input unit 131 and the microphone 122 are disposed at a region adjacent to another end portion thereof. The user input unit 132, the interface unit 170 and the like may be disposed at side surfaces of the front case 101 and the rear case 102.

The user input unit 130 may be manipulated to receive a command input for controlling the operation of the portable terminal 100, and include the first and second manipulation units 131 and 132. The first and second manipulation units 131 and 132 may be referred to as a manipulating portion. The manipulating portion may be operated by a user in any tactile manner.

Contents input by the first and second manipulation units 131 and 132 may variously be set. For example, the first manipulation unit 131 may be configured to input commands such as START, END, SCROLL or the like, and the second manipulation unit 132 may be configured to input a command, such as adjusting an audio sound, a conversion of the display unit 151 into a touch-sensitive mode or the like.

Figure 2B:
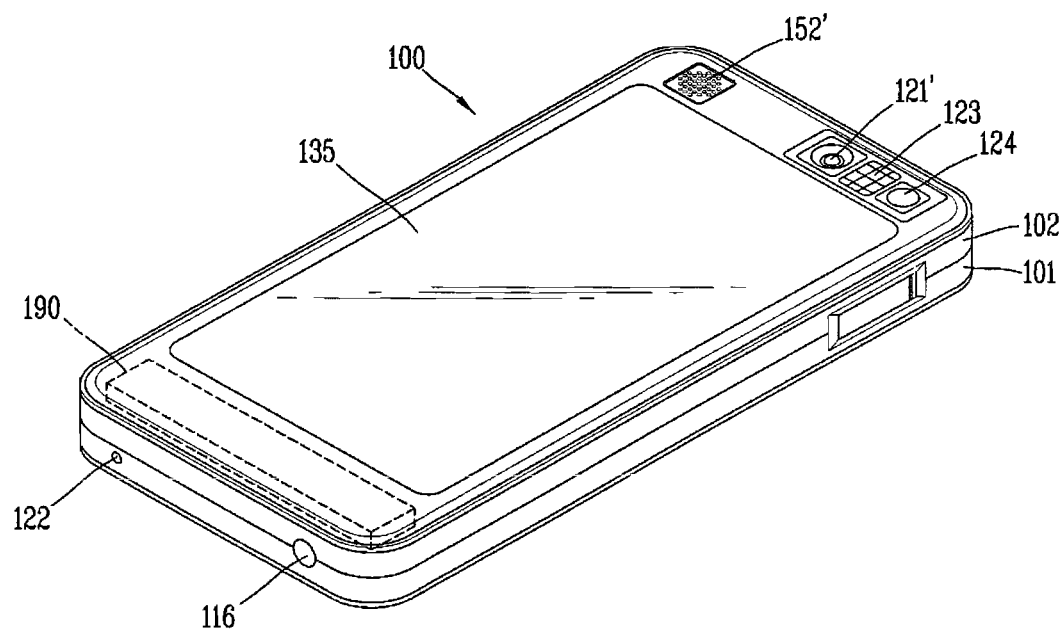
FIG. 2B is a rear perspective view of the mobile terminal in accordance with the one embodiment of the present invention.

FIG. 2B is a rear perspective view of the mobile terminal shown in FIG. 2A.

As shown in FIG. 2B, a rear surface of the terminal body, namely, the rear case 102 may further be provided with a camera 121'. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. Such cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear surface of the terminal body. The audio output module 152' can cooperate with the audio output module 152 (see FIG. 2A) to provide stereo output. Also, the audio output module 152' may be configured to operate as a speakerphone.

A broadcast signal receiving antenna 116 may further be disposed at the side surface of the terminal body in addition to an antenna for communications. The antenna 116 configuring a part of the broadcast receiving module 111 (see FIG. 1) may be retractable into the terminal body.

A power supply unit 190 for supplying power to the mobile terminal 100 may be mounted to the terminal body. The power supply 190 may be internally disposed at the terminal body, or be detachably disposed outside the terminal body.

A touch pad 135 for detecting a touch input may further be disposed at the rear case 102. The touch pad 135 may also be configured to be transparent, as similar to the display 151. In this case, if the display unit 151 is configured to output visible information on its both surfaces, such visible information can be identified via the touch pad 135. Information output on the both surfaces may all be controlled by the touch pad 135. Unlike to this, a display may further be mounted on the touch pad 135 so as to dispose a touch screen even at the rear case 102.

The touch pad 135 operates in cooperation with the display unit 151 of the front case 101. The touch pad 135 may be disposed at the rear side of the display unit 151 in parallel. Such touch pad 135 may be the same as or smaller than the display unit 151.

Hereinafter, description will be given of a cooperative operating mechanism between the display unit 151 and the touch pad 135 with reference to FIG. 3.

Figure 3:
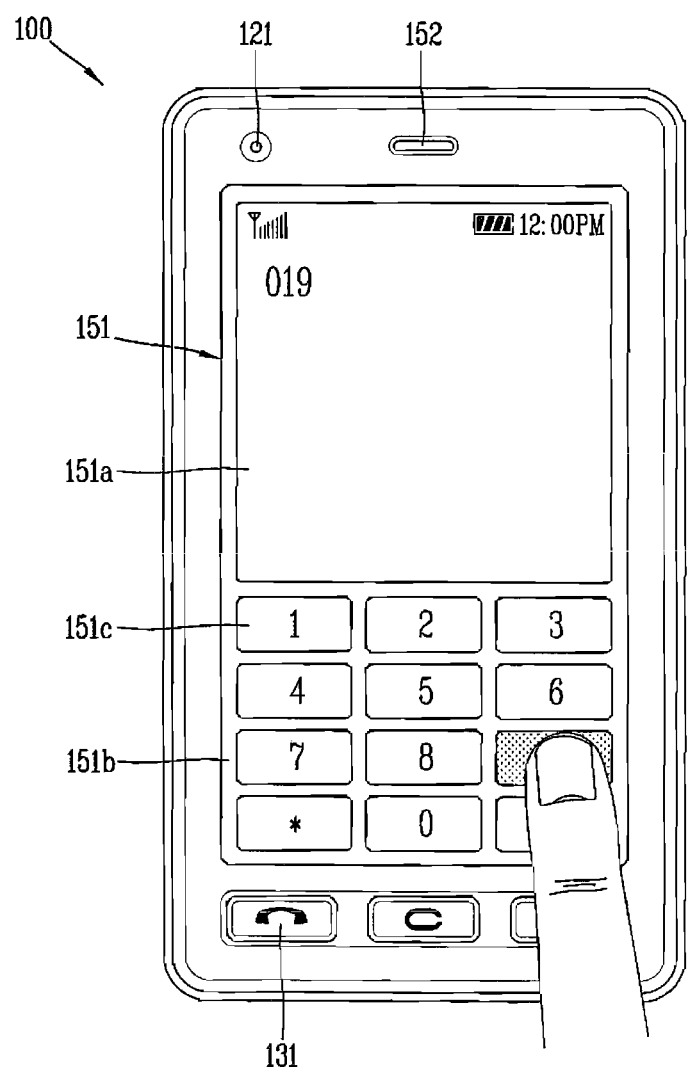
FIG. 3 is a front view of the mobile terminal for showing an operating state of the mobile terminal according to the present invention.

FIG. 3 illustrates a touch input applied on a soft key through a front face of the terminal body.

Various types of visible information may be displayed on the display unit 151. Such information may be displayed in several forms, such as character, number, symbol, graphic, icon or the like.

For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another.

For example, an output window 151a and an input window 151b may be displayed at upper and lower portions of the display unit 151, respectively. The output window 151a and the input window 151b are regions assigned for output or input of information. Soft keys 151c representing numbers for inputting telephone numbers or the like may be output on the input window 151b. When a soft key 151c is touched, a number or the like corresponding to the touched soft key 151c is output on the output window 151a. Upon manipulating the first manipulation unit 131, a call connection for a telephone number displayed on the output window 151a is attempted.

The embodiment exemplarily illustrates a touch input applied to the soft key through the front face of the terminal body. Alternatively, for a terminal having a transparent display, another configuration may be implemented by allowing a touch input applied to a soft key through a rear face of the terminal body.

Also, another configuration may be implemented such that if a terminal, which has been placed in a portrait direction as shown in FIG. 3, is relocated into a landscape direction, the terminal is allowed to change an output screen displayed on the display unit 151 according to the placed direction of the terminal itself.

Figure 4:
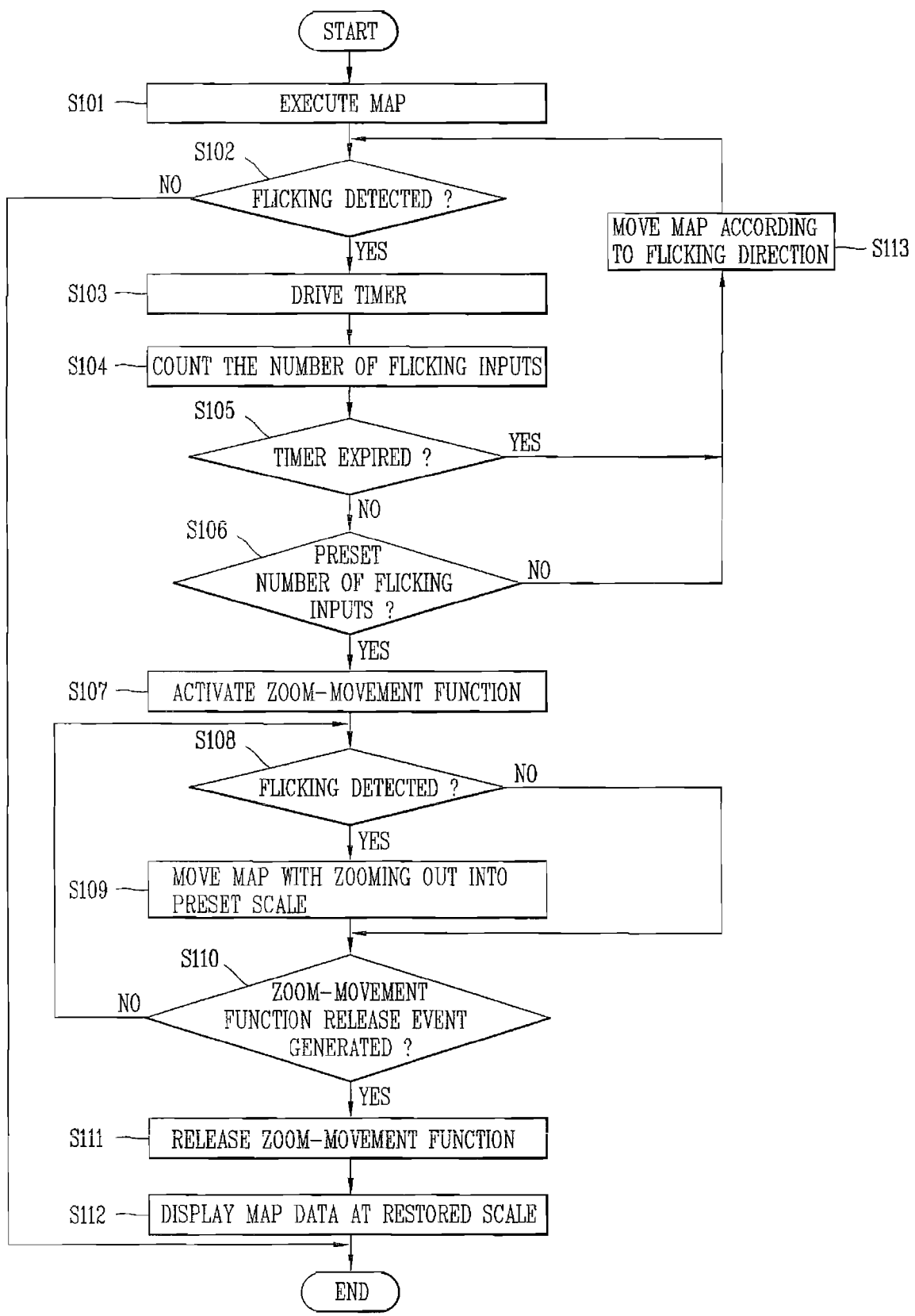
FIG. 4 is a flowchart showing a map searching method of a mobile terminal in accordance with one embodiment of the present invention.

FIG. 4 is a flowchart illustrating a map searching method of a mobile terminal in accordance with one embodiment of the present invention. This embodiment exemplarily illustrates that if a flicking action (operation, motion) is generated after a flicking action is consecutively generated a preset number of times within a preset time, map data zooms out to a preset scale and displayed with being moved whenever the flicking action is generated.

First, upon selection of a map menu by a user's manipulation, the controller 180 executes a map function (S101). The controller 180 drives an information module 115 responsive to input data generated from a user input unit 130, and displays map data on a display screen. The map data may be data stored in the memory 160 or one downloaded via the wireless communication unit 110.

Here, the controller 180 may display map data corresponding to the current position of the terminal on an initial execution screen of the map function. In other words, the controller 180 may acquire current position information of the terminal via the position location module 115 and displays map data matching the acquired position information. Alternatively, the controller 180 may display the most recently displayed map data on the initial execution screen. That is, the controller 180 may display the map data which have been the most recently displayed on the display screen at the most recent time of terminating an activated map function.

If a touch input is detected on the display screen on which the map data is displayed, then the controller 180 checks whether the detected touch input is a flicking action (S102). For example, if a user flicks the display screen displaying the map, the sensing unit 140 detects the flicking and sends a signal informing the detected flicking to the controller 180.

If the detected touch input is a flicking action, the controller 180 starts a timer (S103). Here, a time of the timer may be a preset value by a user's manipulation or a default value set at the time of manufacturing the terminal. The timer is employed to determine whether the detected flicking is a single flicking action or a consecutive flicking action. Also, the timer value may be initialized every time the timer is expired. For example, in case where the timer value is set to 2-second, if two seconds elapse after starting the timer, the timer value is reset to 2-second.

Afterwards, the controller 180 starts a counter to count the number of flicking motions (S104). Here, the counter may be initialized to 0 every time the timer is expired.

The controller 180 checks whether or not the timer is expired (S105). That is, the controller 180 checks whether a preset time (e.g., 2 seconds) elapsed after the flicking input.

According to the checking result, if the timer has not expired yet, the controller 180 then checks whether the counted number of flicking motions reaches a preset number of times (e.g., three times) (S106).

If the counted number of flicking motions matches the preset number of times, the controller 180 activates a zoom-movement function (S107). The zoom-movement function denotes that map data is moved with zooming in/out into a preset scale whenever a move command is input. This embodiment has chosen the name of 'zoom-movement function' because the map data is moved at the same time of zooming out; however, an implementation of moving the map data with zooming in as well as zooming out may also be available.

After the activation of the zoom-movement function, if a touch input is generated on the display screen, the controller 180 detects the touch input via the sensing unit 140 and checks whether the detected touch input is a flicking motion (S108).

After the check (S108), if the touch input is the flicking action, the controller 180 zooms the map to fit into a preset scale and displays the map data with moving the same based upon a flicking direction (S109). That is, the controller 180 reduces the scale of the displayed map data to fit into the preset scale (ratio).

During the zoom-out movement of the map data, the controller 180 checks whether or not a release event of the zoom-movement function is generated (S110). Upon the generation of the zoom-movement function release event, the controller 180 releases the zoom-movement function (S111). For example, if a touch input is detected on one point of the display screen while the map data displayed on the display screen is moved simultaneously upon zooming out the same, then the controller 180 recognizes the detected touch input as a zoom-movement function release command, thereby releasing the zoom-movement function.

After the release of the zoom-movement function, the controller 180 restores the map data to the scale prior to the activation of the zoom-movement function and displays the map data (S112). Here, the controller 180 may adjust the scale of the map data such that a point of the map data corresponding to the touched point can be located at the center of the display screen. Alternatively, the controller 180 may stop the zoom-out movement of the map data at the same time when the touch input is detected, and display the map data by adjusting the map data to be on a default scale based upon the touched point.

At the step S110, if the zoom-movement function is not in the released state, the controller 180 zooms out the map data every time a flicking input is generated.

At the step S106, if the counted number of flicking actions does not reach the preset number, the controller 180 then displays the map data on the display screen with moving the same based upon the detected flicking action (S112). Here, upon detecting the flicking action, the controller 180 may determine movement speed and direction of the map data in response to the flicking speed and direction.

At the step S105, if the timer is not in the expired state, the controller 180 moves the map data based upon the detected flicking operation, so as to display the map data on the display screen (S113).

The embodiment exemplarily illustrates that the zoom-movement function is activated when a flicking operation is generated a preset number of times within a preset time, and map data is moved with zooming out to fit into a preset scale every time the flicking operation is detected. However, the present invention may not be limited to the embodiment. When the flicking operation is generated a preset number of times within the preset time, the zoom-movement function is activated and simultaneously the map data zooms out to the preset scale so as to be displayed with being moved.

For example, if the flicking action (i.e., consecutive flicking) is detected a preset number of times within a preset time, the controller 180 zooms out the map data to fit into a preset scale and displays the map data with moving the same based upon the detected flicking action. If a flicking action is detected after the zoom-out movement of the map data, the controller 180 displays the zoomed-out map data with moving the same based upon the detected flicking action.

In the meantime, if a consecutive flicking is re-detected after the zoom-out movement of the map data, the controller 180 zooms out the reduced map data again to fit into a preset scale and moves and displays the re-zoomed-out map data.

Figure 5:
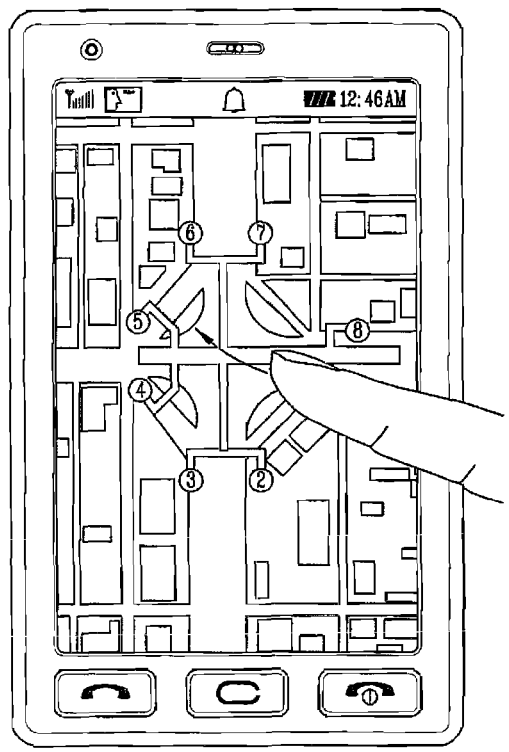
FIGS. 5(a) to 5(d) are screens showing respective steps of the map searching process of the mobile terminal in accordance with the one embodiment of the present invention.
Figure 5:
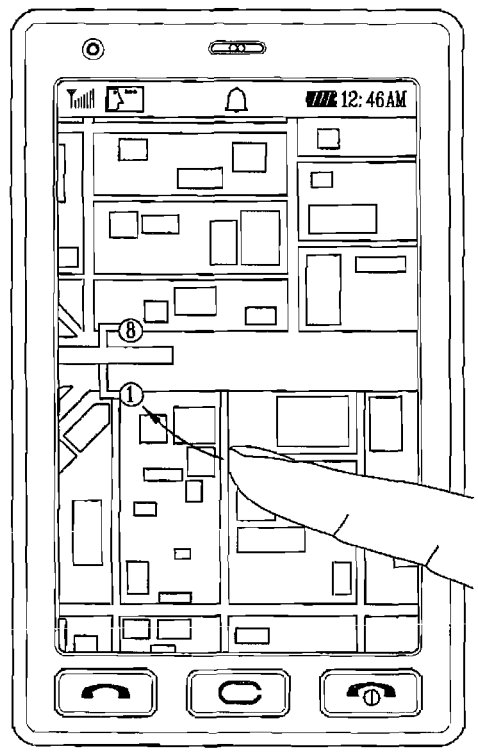
Figure 5:
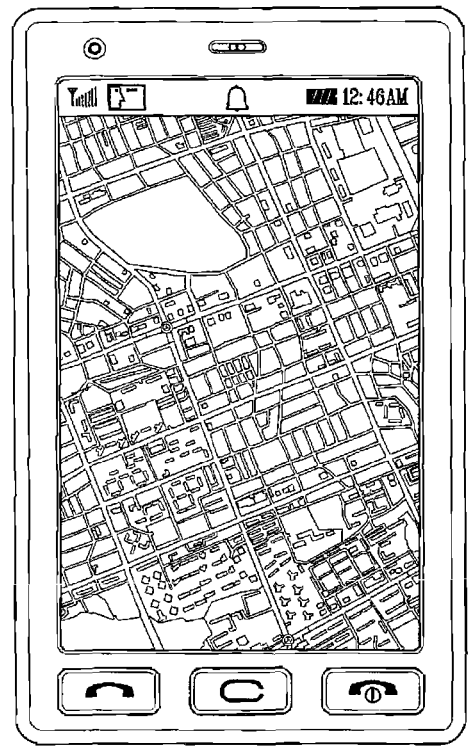
Figure 5:
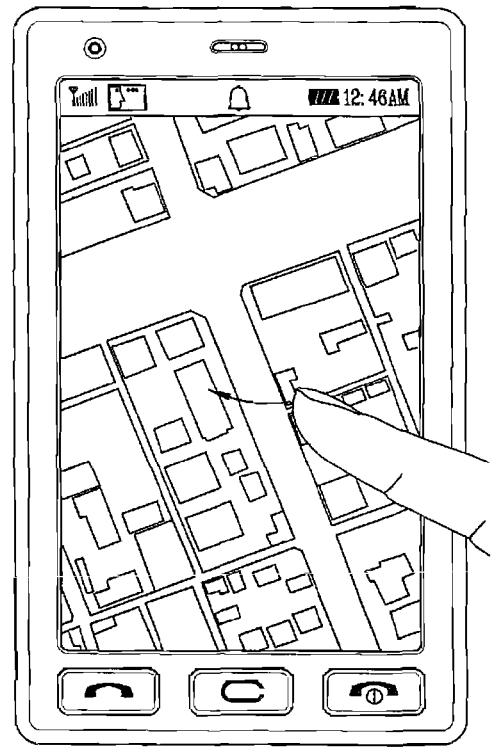

FIG. 5 illustrates screens for respective steps of a map searching process in the mobile terminal in accordance with the one embodiment of the present invention. This embodiment exemplarily illustrates a case where a zoom-movement function is activated when a flicking action is input consecutively two times within a preset time.

When a user selects a map menu, the controller 180 fetches map data from the memory 160 and displays the same on the display unit 151. Here, the controller 180 drives a position location module 115 to check a current position of the mobile terminal 100. When the current position of the mobile terminal 100 is checked, the controller 180 marks the current position on the map data. Here, the controller 180 may move the map data such that the current position of the terminal is displayed on the center of the display screen.

If a user inputs a first flicking on the display screen for displaying the map data, the controller 180 detects the first flicking through the sensing unit 140 (see FIG. 5(*a*)). Upon the detection of the first flicking, the controller 180 moves the map data responsive to the first flicking and simultaneously displays the same on the display screen.

If a second flicking follows the first flicking, the controller 180 detects the second flicking through the sensing unit 140 (see FIG. 5(*b*)). Upon the detection of the second flicking, the controller 180 checks whether or not the second flicking is consecutively input after the first flicking. In other words, the controller 180 checks whether the second flicking is generated within a preset time after the first flicking operation.

If the second flicking is generated within the preset time after the first flicking operation, the controller 180 activates a zoom-movement function. Here, the controller 180 activates the zoom-movement function and moves the map data with zooming out to fit into a preset scale.

Here, if the second flicking is generated after the elapse of the preset time after the first flicking operation, the controller 180 executes a general flicking operation. That is, the controller 180 moves the map data according to flicking speed and direction so as to display the same on the display screen. Here, the controller 180 determines movement speed and distance of the map data according to the flicking speed.

After the activation of the zoom-movement function, if a third flicking is detected, the controller 180 moves the map data with zooming out into a preset scale and display the map data (see FIGS. 5(*c*) and 5(*d*)).

Figure 6:
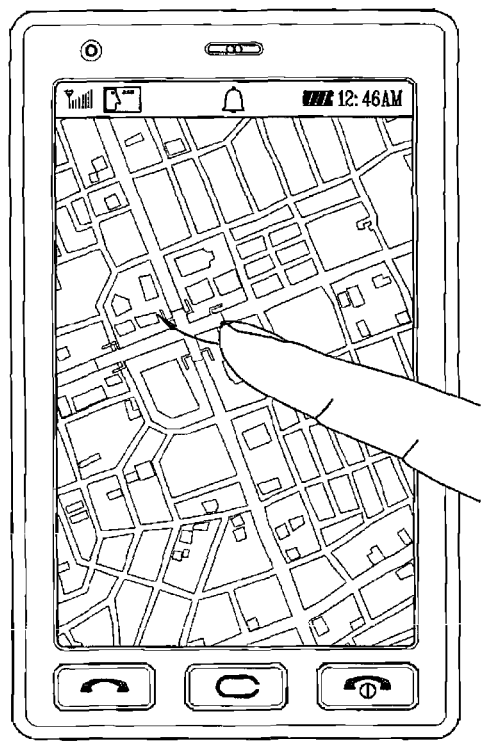
FIGS. 6(a) to 6(c) are screens showing respective steps of a process for releasing a zoom-movement function in the mobile terminal in accordance with the one embodiment of the present invention.
Figure 6:
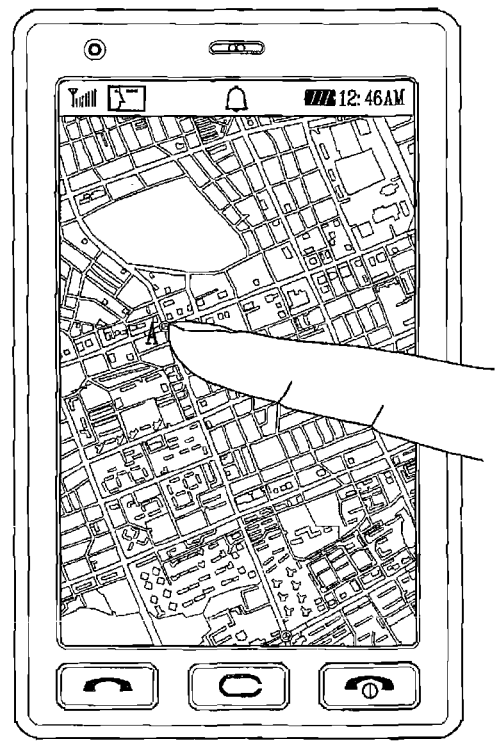
Figure 6:
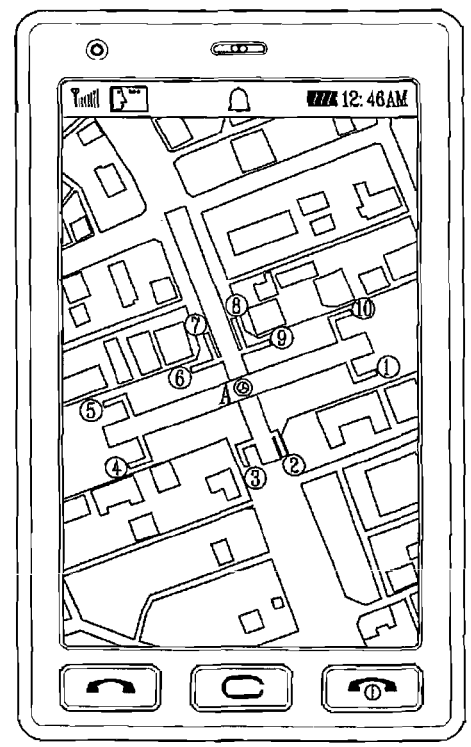

FIG. 6 illustrates screens for respective steps of a process for releasing a zoom-movement function in the mobile terminal in accordance with one embodiment of the present invention.

If a flicking action is detected in an activated state of the zoom-movement function, the controller 180 recognizes the flicking as a zoom-out move command and thus moves the map data with zooming out into a preset scale (see FIGS. 6(*a*) and 6(*b*)). The controller 180 displays the zoomed-out map data on the display screen. While moving the map data with zooming it out, if a short touch or a long touch is input on a specific point on the display screen, the controller 180 detects the touch input through the sensing unit 140. The controller 180 recognizes the touch input as a zoom-movement function release command and thus stops the zoom-out movement of the map data. That is, the controller 180 releases the zoom-movement function. Also, the controller 180 restores the scale of the map data to a scale prior to the activation of the zoom-movement function. The controller 180 also moves the scale-restored map data such that a point on the map corresponding to the touched point is displayed at the center of the display screen (see FIG. 6(*c*)).

For example, as shown in the drawings, if a long touch is input during zoom-out movement of the map data, the controller 180 restores the scale of the map data to the scale prior to the activation of the zoom-movement function. The controller 180 moves the map data such that point A corresponding to the long touch point is displayed at the center of the display screen. That is, the controller 180 moves the corresponding location on the map data corresponding to the touch point based upon a region for displaying the map data, of the entire screen of the display unit 151.

Figure 7:
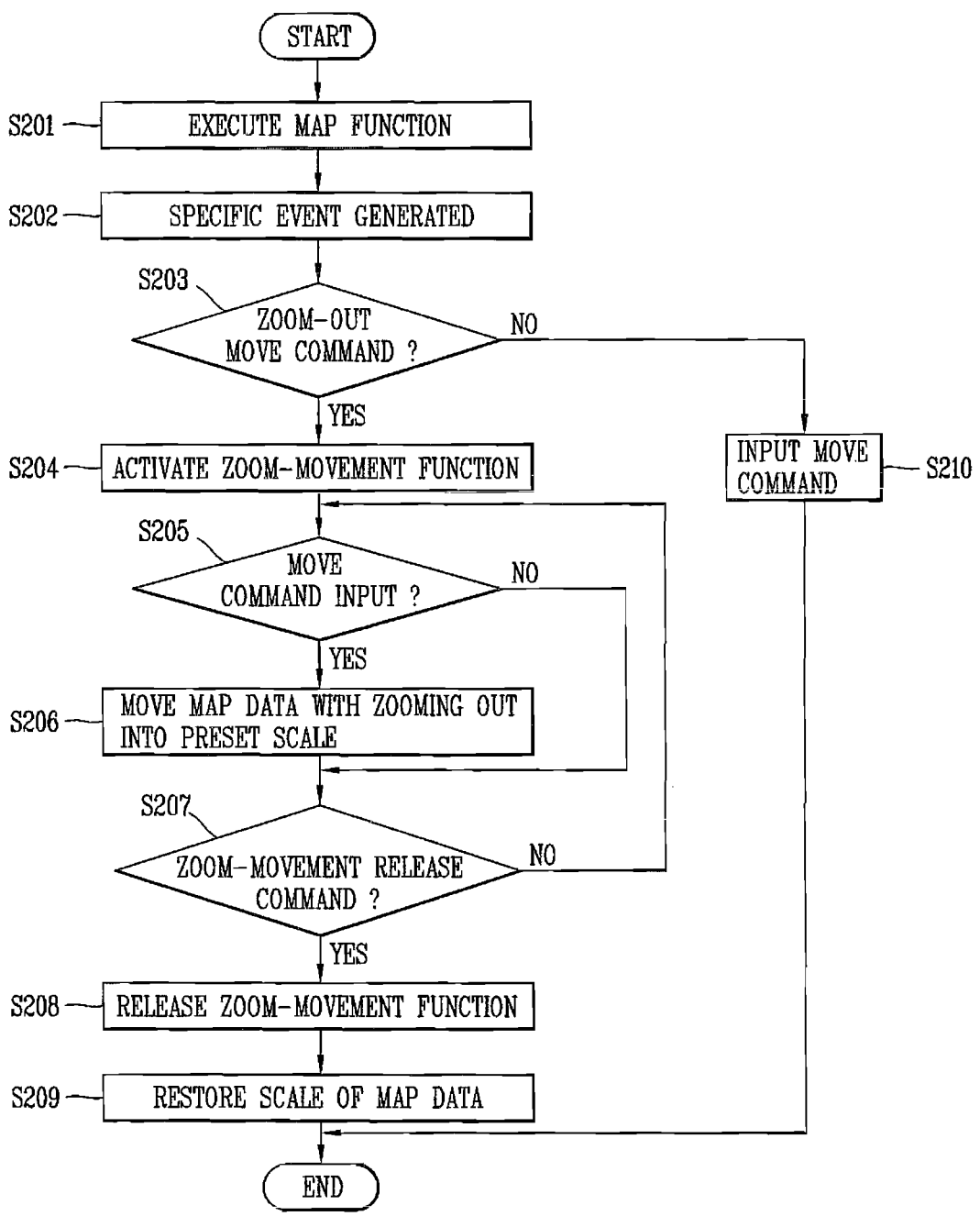
FIG. 7 is a flowchart showing a map searching method of a mobile terminal in accordance with another embodiment of the present invention.

FIG. 7 is a flowchart illustrating a map searching method of a mobile terminal in accordance with another embodiment of the present invention.

Referring to FIG. 7, the controller 180 executes a map function responsive to a command input via the user input unit 130 (S201). For example, if a menu button of the user input unit 130 is pressed, the controller 180 displays a menu screen on the display screen. If the user selects a map menu of menus displayed on the display screen, the controller 180 executes a map application in response to the user input.

Here, the controller 180 may execute the map function and drive the position location module 115. The position location module 115 acquires current location information relating to the terminal and sends the same to the controller 180. Upon the reception of the current location information relating to the terminal from the position location module 115, the controller 180 displays the map data corresponding to the current location information to be located at the center of the display screen.

If a specific event is generated while displaying the execution screen of the map function, the controller 180 detects the event generation through the sensing unit 140. Here, the specific event may include short touch, long touch, drag, flicking and the like. For example, if a touch input is generated on the display screen for displaying the map, the sensing unit 140 may detect the touch input and send coordinate values for the touched point to the controller 180.

Upon the generation of the specific event, the controller 180 checks whether or not the specific event is a zoom-movement function activate command (S203).

If the specific event is the zoom-movement function activate command, the controller 180 activates the zoom-movement function (S204).

After the activation of the zoom-movement function, the controller 180 checks whether a move command is input (S205). Here, the move command may include drag, flicking and the like.

If the move command is input, the controller 180 moves the map data with zooming out into a preset scale (S206). The preset scale may be determined depending on a touch time, a dragging distance, a distance between multiple touches, a distance from a center of the screen to a touched point, and the like.

The controller 180 checks whether or not a zoom-movement function release event is generated during the zoom-out movement of the map data (S207).

At the step S207, if the zoom-movement function release event is generated, the controller 180 releases the zoom-movement function (S208). The controller 180 then restores the scale of the map data to the scale prior to the activation of the zoom-movement function (S209).

If the specific event is not the zoom-movement function activate command at the step S203, the controller 180 performs an operation assigned to the specific event (S211). For example, upon the generation of the specific event, the controller 180 may display the map data with moving the same in response to a drag event.

The embodiment exemplarily illustrates that when a move command such as drag and flicking is detected after activating the zoom-movement function, map data is moved with zooming out to fit into a preset scale in response to the move command. However, the present invention may not be limited to the embodiment. Alternatively, other configuration may be implemented, in which the controller 180 may activate the zoom-movement function and zooms out the map data into a preset scale and thereafter moves the zoomed-out map data when a move command is detected.

Figure 8:
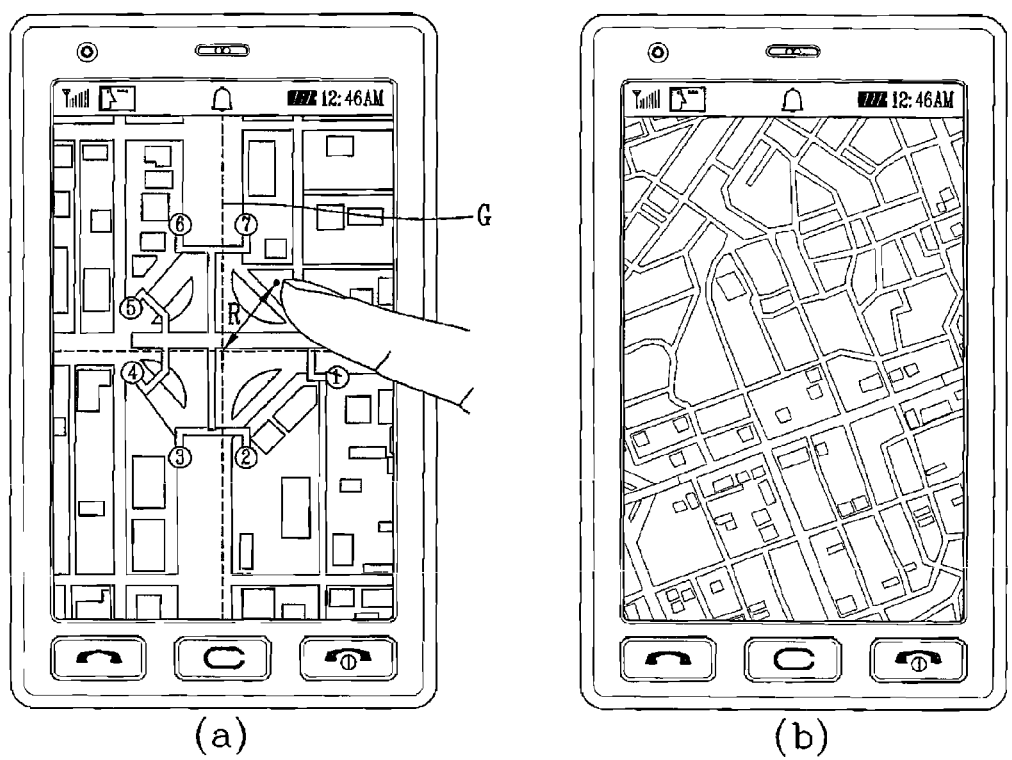
FIGS. 8(a) and 8(b) are exemplary views showing a process of moving map data with zooming out the same in the mobile terminal in accordance with the another embodiment of the present invention.

FIG. 8 illustrates an exemplary process of moving map data with zooming out the same in the mobile terminal in accordance with the another embodiment of the present invention.

First, if a user selects a map menu, the controller 180 executes a map function and displays map data on the display screen. Here, the controller 180 may display a guide line G for indicating a center of the display screen.

If a long touch is input on one point of the display screen for displaying the map data, the controller 180 recognizes the long touch as a zoom-movement function activation event so as to activate the zoom-movement function. Afterwards, if the long touch is released, the controller 180 recognizes the release of the long touch as a move command, so as to calculate a distance R from the center of the display screen to the long touch point.

The controller 180 then adjusts the scale of the map data based upon the calculated distance R. For example, if the distance R from the screen center to the long touch point is 20 mm, the controller 180 adjusts the scale from 1/250 to 1/500.

The controller 180 adjusts the scale of the map data and moves the map data to display on the display unit 151.

Figure 9:
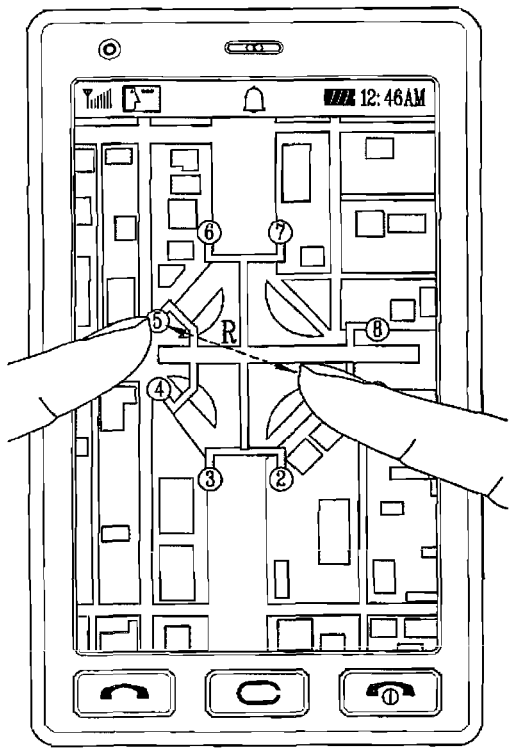
FIGS. 9(a) to 9(c) are another exemplary views showing the process of moving map data with zooming out the same in the mobile terminal in accordance with the another embodiment of the present invention.
Figure 9:
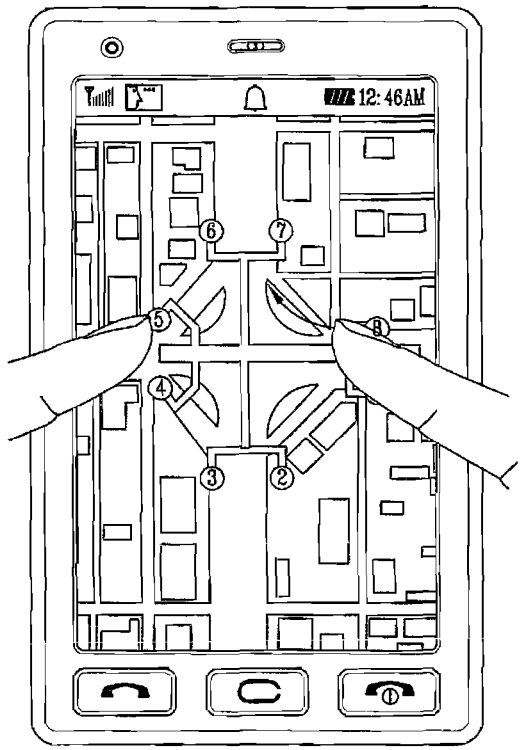
Figure 9:
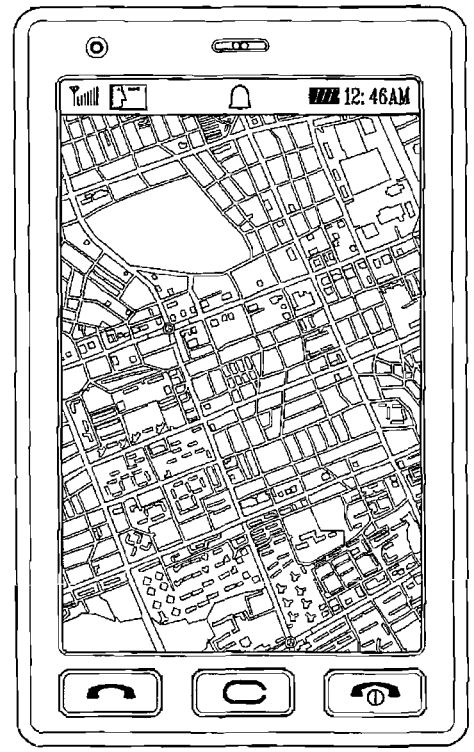

FIG. 9 illustrates another exemplary process of moving map data with zooming out the same in the mobile terminal in accordance with the another embodiment of the present invention.

First, the controller 180 displays map data on the display screen in response to a user input. If multiple touches are input on the display screen on which the map data is output, the controller 180 recognizes the multiple touches as a zoom-movement function activate command so as to activate the zoom-movement function (see FIG. 9(a)). Upon the multi-touch input, the controller 180 may acquire each location information relating to multi-touched points through the sensing unit 140.

The controller 180 calculates a distance R between the multi-touched points based upon the location information. The controller 180 then temporarily stores the calculated distance information in the memory 160.

In a state of holding one of the multiple touches, if another touch input of the multiple touches is changed, the controller 180 detects the change through the sensing unit 140 (see FIG. 9(b)). If the changed touch input is a flicking action, the controller 180 adjusts the scale of the map data based upon the calculated distance R between the multi-touched points, and displays the scale-adjusted map data with moving the same according to the flicking speed and direction (see FIG. 9(c)).

In other words, in a state of holding one of the multiple touches after the multiple touches are input, if another touch is released and a move command is input, the controller 180 recognizes the move command as a zoom-out move command so as to zoom out the map data and display the zoomed-out map data with moving the same.

Figure 10:
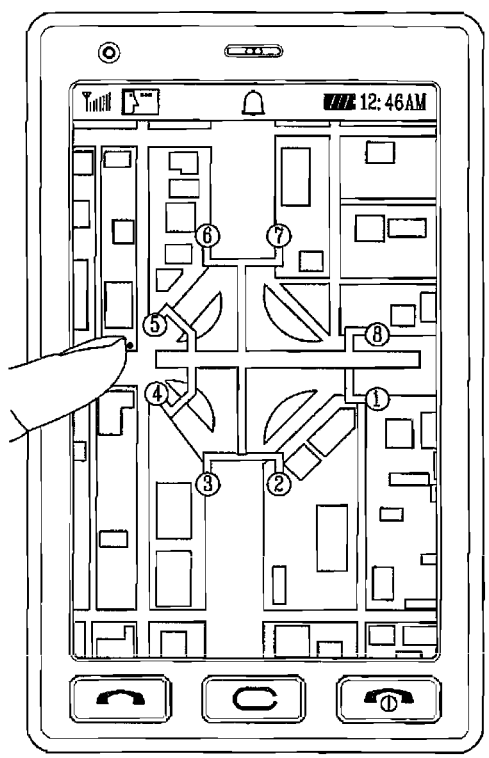
FIGS. 10(a) to 10(c) are another exemplary views showing the process of moving map data with zooming out the same in the mobile terminal in accordance with the one embodiment of the present invention.
Figure 10:
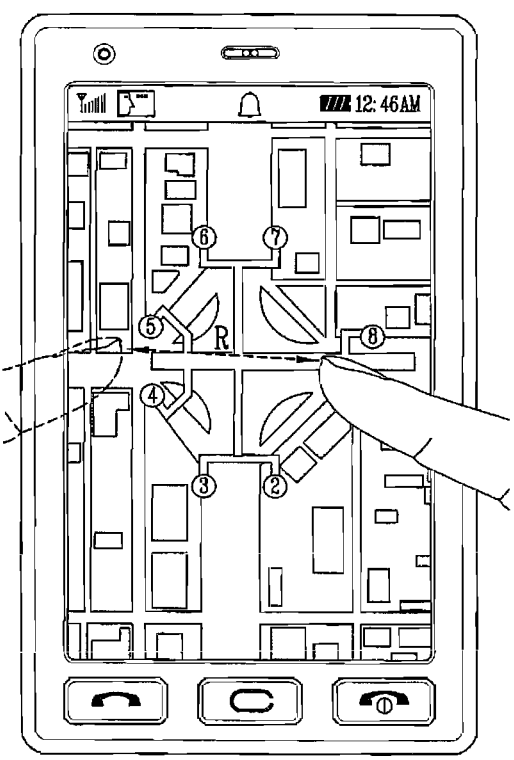
Figure 10:
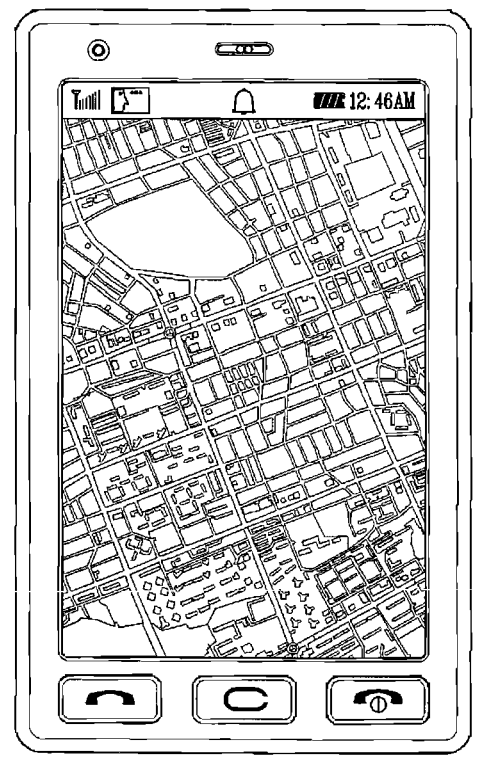

FIG. 10 illustrates another exemplary process of moving map data with zooming out the same in the mobile terminal in accordance with the one embodiment of the present invention.

Referring to FIG. 10, the controller 180 displays map data on the display unit 151. If a touch is input on the screen of the display unit 151, the sensing unit 140 sends coordinate values of the touched point to the controller 180. If the touch is held for a preset time, the controller 180 recognizes the touch as a long touch, and if the touch is released within a preset time, recognizes the touch as a short touch.

Upon an input of the long touch, the controller 180 recognizes the long touch as a zoom-movement function activation command so as to activate the zoom-movement function (see FIG. 10(a)). Here, the controller 180 may display an icon indicating the activation of the zoom-movement function on one point of the display screen.

If the touched point is dragged in an unreleased state of the long touch, the controller 180 recognizes the dragging as a zoom-out move command and accordingly adjusts the scale of the map data so as to move and display the scale-adjusted map data (see FIGS. 10(b) and 10(c)). Here, the controller 180 calculates a distance R between the long touch point and the dragged touch point and changes the scale of the map data based upon the calculated distance. That is, the controller 180 determines the zoom-out scale of the map data based upon the drag distance after the long touch.

Meanwhile, if the touch having followed the long touch is released and another point of the display screen is touched, the controller 180 zooms in the map data according to the distance between the long touch point and the another touch point, and moves the zoomed-in map data for displaying.

If any move command is not input within a preset time during the zoom-out or zoom-in movement, the controller 180 restores the scale of the map data to the scale prior to the activation of the zoom-movement function and displays the scale-restored map data.

Figure 11:
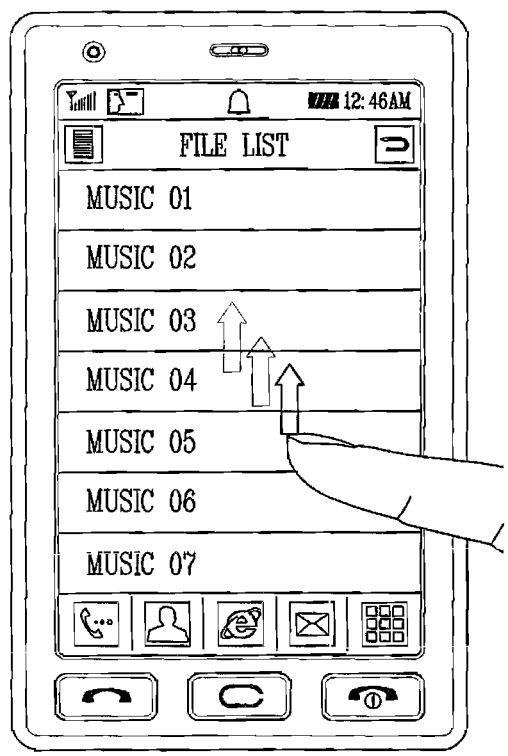
FIGS. 11(a) to 11(c) are another exemplary screens showing respective steps of a data searching process in the mobile terminal in accordance with the one embodiment of the present invention.
Figure 11:
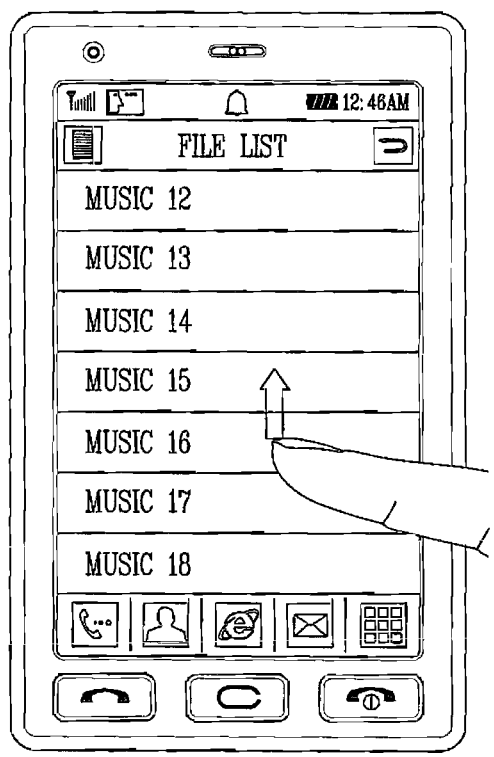
Figure 11:
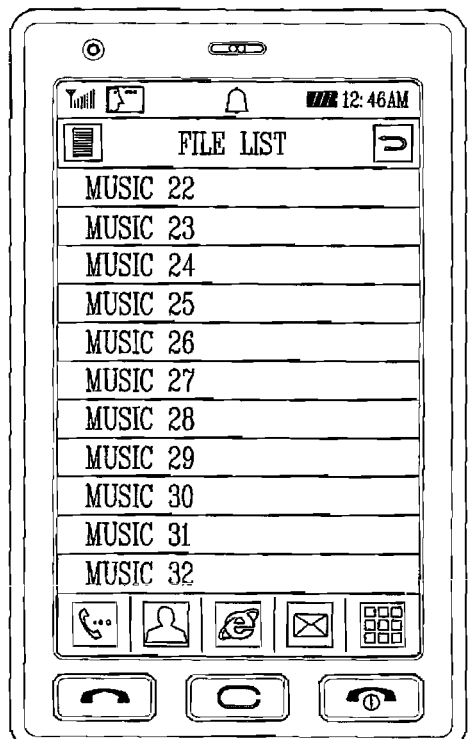

FIG. 11 illustrates screens for respective steps of a data searching process of a mobile terminal in accordance with one embodiment of the present invention. This embodiment exemplarily illustrates that one of music files is searched out of a list of music files.

First, if a multimedia player menu is selected by a user, the controller 180 drives a multimedia module 181 and fetches a list of reproducible music files and displays the same on the display screen.

Here, if the user desires to play one music in the list of reproducible music files, the user generates a flicking operation. The controller 180 detects the flicking operation through the sensing unit 140.

If the flicking operation is generated consecutively three times within a preset time, the controller 180 activates a zoom-movement function. The controller 180 then checks whether a further flicking event is generated after the activation of the zoom-movement function.

If the further flicking event is generated according to the check result, the controller 180 zooms out the file list screen to fit into a preset scale every time the flicking event is generated, and scrolls the file list. That is, as the file list screen is scaled down, the number of music files capable of being displayed on the display screen at once increases.

The controller 180 displays the file list screen, which was scrollably zoomed out, on the display unit 151.

The mobile terminal, in accordance with at least one embodiment of the present invention having such configuration, is capable of adjusting a scale of map data and displaying the map data with moving the same if a flicking event is consecutively generated a preset number of times. Therefore, a user can fast search for a desired position on the map.

Also, in accordance with one embodiment of the present invention, the aforesaid methods may be implemented in a medium having a program recorded as computer-readable codes. The computer-readable medium may include all types of recording apparatuses each storing data which is readable by a computer system. Examples of such computer-readable media may include ROM, RAM, CD-ROM, magnetic tape, floppy disk, optical data storage element and the like. Also, such computer-readable medium may be implemented in a type of a carrier wave (e.g., a transmission via an Internet). The computer can include the controller 180 of the mobile terminal.

The configurations and methods of the previously described embodiments may not be limitedly applied to the aforementioned mobile terminal but it would be understood that the present invention can be implemented by selectively combining the aforementioned embodiment(s) entirely or partially The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A map searching method for a mobile terminal, the method comprising:
   executing a map function of the mobile terminal;
   displaying map data on a touch screen of the mobile terminal;
   detecting receipt of a first flicking input on the touch screen, wherein the first flicking input, which is received on the touch screen with a movement in a specific direction, is distinguishable from a touch input that is received on the touch screen displaying the map data without any movement;
   controlling the touch screen to move the map data according to the specific direction of the first flicking input without zooming-out the map data in response to the first flicking input when the first flicking input is not followed by further flicking inputs, wherein the map data is not moved in response to the touch input;
   activating a move and zoom-out function of the mobile terminal when receipt of at least one consecutive flicking input is detected following the first flicking input such that a preset number of consecutive flicking inputs are detected within a first preset time period, the first preset time period starting when the first flicking input is detected, wherein the displayed map data is not moved and not zoomed-out when the move and zoom-out function is activated until a further flicking input is received while the move and zoom-out function is activated;
   detecting receipt of a single flicking input on the touch screen after the move and zoom-out function is activated;
   controlling the touch screen to move the map data in a direction corresponding to a flicking direction of the single flicking input and at the same time to zoom-out the map data to a preset scale in response to the single flicking input, wherein the map data is not moved and the zoom-out of the map data is not performed when the move and zoom-out function has been activated until the receipt of the single flicking input is detected.

2. The method of claim 1, further comprising:
   detecting receipt of another preset number of flicking inputs within the first preset time period on the touch screen after the move and zoom-out of the map data; and
   controlling the touch screen to further move and zoom-out the moved and zoomed-out map data to another preset scale based on the detected further preset number of flicking inputs.

3. The method of claim 1, further comprising:
   restoring the map data to an original scale when no receipt of a flicking input is detected within a second preset time period after the move and zoom-out of the map data.

4. The method of claim 1, further comprising:
   detecting receipt of a further single flicking input on the touch screen after the move and zoom-out of the map data; and
   controlling the touch screen to further move and zoom-out the moved and zoomed-out map data based on the detected further single flicking input.

5. The method of claim 1, further comprising:
   detecting receipt of a move and zoom-out stop input on the touch screen during the moving and zooming-out of the map data;
   discontinuing the moving and zooming-out of the map data based on the detected move and zoom-out stop input; and
   restoring the map data to an original scale and position on the touch screen.

6. The method of claim 5, wherein the move and zoom-out stop input comprises a touch or long touch input on the touch screen.

7. A map searching method for a mobile terminal, the method comprising:
   executing a map function of the mobile terminal;
   displaying map data on a touch screen of the mobile terminal;
   detecting receipt of a flicking input on the touch screen, wherein the flicking input, which is received on the touch screen with a movement in a specific direction, is distinguishable from a touch input that is received on the touch screen displaying the map data without any movement;
   counting a number of at least one flicking input included in the flicking input;
   controlling the touch screen to substantially simultaneously move the map data and zoom-out the map data in response to the detected flicking input when the flicking input comprises a preset number of consecutive flicking inputs received within a preset time after receiving an initial flicking input of the consecutive flicking inputs, wherein the map data is moved in the specific direction specified by the flicking input and at the same time, the map data is zoomed-out to a scale specified by the flicking input; and
   controlling the touch screen to move the map data without zooming-out the map data when a number of the at least one flicking input that is detected within the preset time is less than the preset number, wherein the map data is moved in the specific direction specified by the flicking input while the map data is not moved and not zoomed-out in response to the touch input.

8. The method of claim 7, wherein the detecting the move and zoom-out input comprises:
   detecting substantially simultaneous receipt of a first touch on a first position of the touch screen and a second touch on a second position of the touch screen; and
   detecting a flicking of the second touch on the second position of the touch screen while the first touch on the first position of the touch screen is maintained.

9. The method of claim 8, wherein a moving speed and a zoom-out scale of the map data are based on a movement speed of the flicking of the second touch on the second position on the touch screen.

10. The method of claim 8, wherein a zoom-out scale of the map data is based upon a distance between the first point and the second point.

11. The method of claim 7, wherein the detecting the flicking input comprises detecting a touch held for a preset time on a position on the touch screen followed by detection of a drag on the touch screen of the held touch.

12. The method of claim 11, wherein a moving speed and a zoom-out scale of the map data are based upon a distance of the detected drag.

13. A mobile terminal, comprising:
a communication unit configured to receive map data;
a touch screen configured to display the map data; and
a controller configured to:
- detect a flicking input received via the touch screen displaying the map data, wherein the flicking input, which includes a movement in a specific direction, is distinguishable from a touch input that is received on the touch screen displaying the map data without any movement;
- control the touch screen to substantially simultaneously zoom-out the map data based on a zoom-out scale determined based upon the flicking input, and at the same time to move the map data in the specific direction specified by the flicking input and at a speed determined based upon the detected flicking input when the flicking input comprises a preset number of consecutive flicking inputs received within a preset time after receiving an initial flicking input of the consecutive flicking inputs; and
- control the touch screen to move the map data without zooming-out the map data when a number of the at least one flicking input that is detected within the preset time is less than the preset number, wherein the map data is moved in a direction corresponding to the specific direction specified by the flicking input, while the map data is not moved and not zoomed-out in response to the touch input.

14. The terminal of claim 13, wherein the controller is further configured to determine a movement speed based upon at least a detected speed of the flicking input.

15. The terminal of claim 13, wherein the controller is further configured to:
- detect receipt of at least one further flicking input after the detection of the flicking input; and
- control the touch screen to further move and zoom-out the zoomed-out and moved map data to a preset scale based on each of the at least one further flicking input.

16. The terminal of claim 13, wherein:
the flicking input comprises a substantially simultaneous receipt of a first touch on a first position of the touch screen and a second touch on a second position of the touch screen; and
the controller is further configured to detect a flicking of the second touch on the second position of the touch screen while the first touch on the first position of the touch screen is maintained.

17. The terminal of claim 13, wherein the flicking input comprises a touch held for a preset time on a position on the touch screen followed by a drag on the touch screen of the held touch.

18. The terminal of claim 13, wherein the controller is further configured to:
- detect receipt of a move and zoom-out stop input received via the touch screen during the moving and zooming-out of the map data; and
- control the touch screen to discontinue the moving and zooming-out of the map data based on the detected move and zoom-out stop input.

19. The terminal of claim 18, wherein the controller is further configured to control the touch screen to restore the map data to an original scale and position based on the detection of the move and zoom-out stop input.

* * * * *